SYSTEM FOR DIGITAL COMMUNICATION ERROR MEASUREMENTS INCLUDING SHIFT REGISTERS WITH IDENTICAL FEEDBACK CONNECTIONS
Filed Aug. 19, 1963
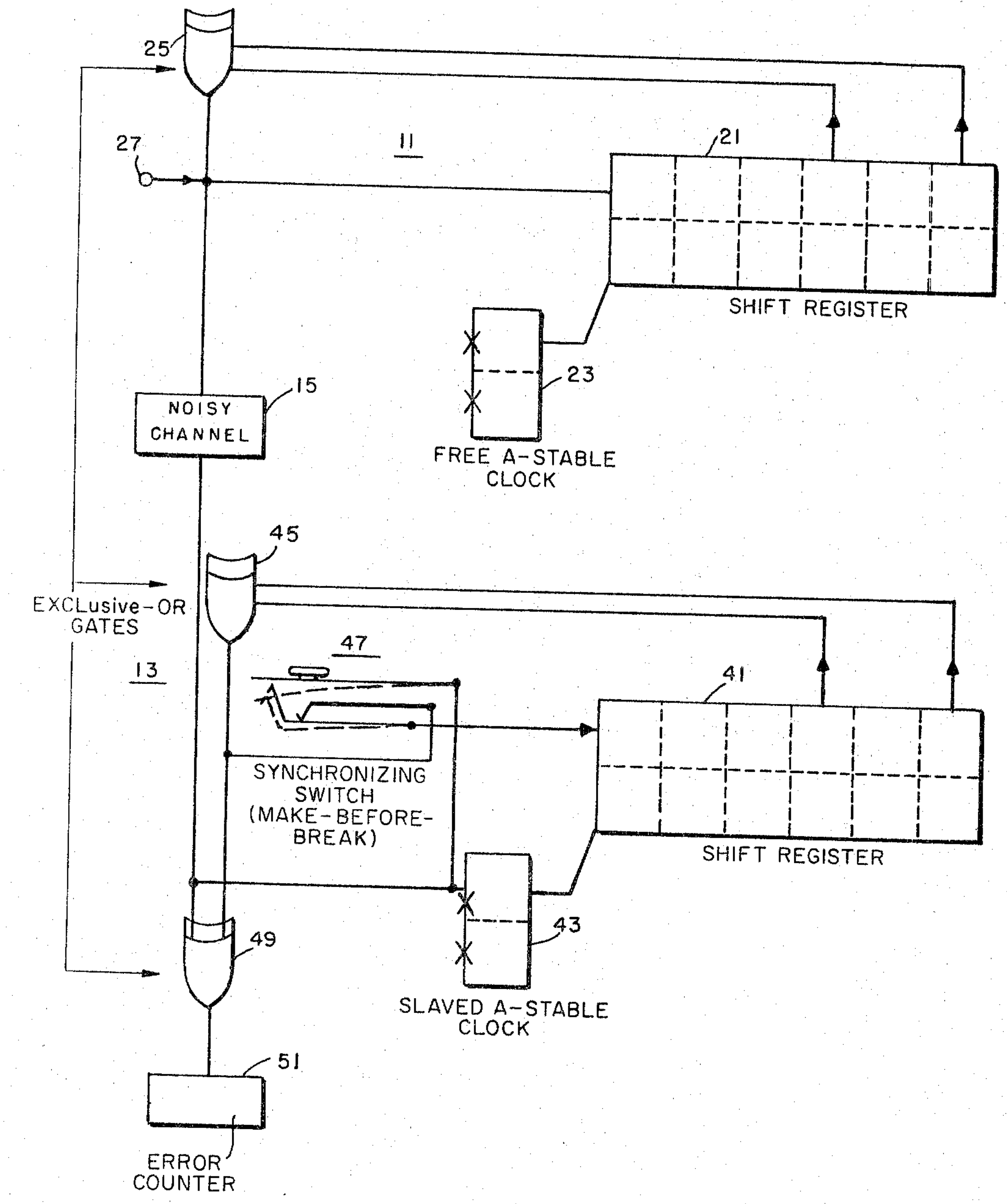
INVENTORS,
JACK FUTERFAS
ROGER F. SALAVA
JACK E. STOUT
BY
Harry M. Saragovitz
ATTORNEY.

3,315,228

SYSTEM FOR DIGITAL COMMUNICATION ERROR MEASUREMENTS INCLUDING SHIFT REGISTERS WITH IDENTICAL FEEDBACK CONNECTIONS

Jack Futerfas, New Shrewsbury, N.J., Roger F. Salava, Evanston, Ill., and Jack E. Stout, Dayton, Ohio, assignors to the United States of America as represented by the Secretary of the Army Filed Aug. 19, 1963, Ser. No. 303,191
3 Claims. (Cl. 340—146.1)

This invention relates to the measurement or counting of errors occurring during testing of a digital communication channel. It is common in this field to transmit a quasi-random signal of the same statistical properties as actual information messages for which the channel is intended, then to generate the same quasi-random signal at the receiver terminal, then to count the error occurring with the system merely by comparing the transmitted signal as actually received with the signal generated at the receiver. It is readily apparent that in order to make such as comparison the signals must be in exact synchronism. Various rather elaborate systems have been previously used to maintain such synchronism.

A particularly convenient means for generating a sequence of digital signals of a quasi-random nature at the transmitter involves a binary register shifted by successive clock pulse inputs and having a feedback from certain stages of the register to the signal input of such register. This produces at the signal input a long train of pulses in quasi-random pattern, which repeats at the end of such train, typically of a length one less than the value 2 raised to a power corresponding to the number of stages in the register. Another identical shift register system at the receiver will generate the same train of pulses. In using such shift register generators for testing operation of a communication channel as indicated above, it is necessary to synchronize the generator at the receiver terminal to correspond to that at the transmitter terminal.

There are two separate aspects of this synchronization. The synchronization of the receiver clock is commonly referred to as baud synchronization and can be used to correct for drift in phase and minor drift in frequency of the receiver clock relative to the transmitter clock. The techniques for baud synchronization are well understood in the art and are followed herein. In teletype operation, in addition to the baud synchronization, it is necessary to provide a character or frame synchronization in order that each group of bauds can be properly assigned to a decoding circuit. In the present test system the entire quasi-random train may be considered as analogous to such a frame even though a comparatively large number of pulses are involved. In the present case the reasons to synchronize the generation of the long trains of pulses are slightly different, although somewhat analogous, so that the corresponding pulses will be compared at the receiver; otherwise since the patterns are of quasi-random nature, on a statistical basis half of the received signals would agree and half would disagree with the signals generated at the receiver and the output of an error counter would show 50% errors.

In the receiver, instead of the feedback signal it is possible to apply the received signal as the input to the shift register and to compare the received signal to the feedback signal, now disconnected from the shift register input. However, in this case each error is likely to be counted additional times according to a rather complex pattern, but roughly equal to the number of feedback paths from the shift register. This multiple count can be avoided in a very simple manner according to the present invention, first by using the received signal as an input to the shift register to attain synchronization, then connecting the feedback path also as input, and then disconnecting the received signal as input. Providing that no errors are being propagated thru the shift register at the time of switching from one input to the other, the register will then be precisely synchronized as to the frames and will stay in synchronism if the clock rate is stable. Ordinarily the channel signal, unless excessively noisy, will provide the necessary baud synchronization to maintain the stable clock rate required. As soon as frame synchronization fails the error rate shown by the counter will jump to 50% and the operator can repeat the switching of the input to the shift register to restore synchronization. It is a relatively simple matter to perform this switching automtaically whenever the error rate indicates a failure of synchronism.

The invention will be further discussed in connection with the single figure of the accompanying drawing. This figure shows a transmitter terminal 11 and receiver terminal 13 connected by a noisy channel 15 being tested to determine the error rate. The quasi-random digital signal generator in the transmitter terminal involves the shift register 21 of six stages with its shift operation controlled by a clock pulse generator 23, shown as an astable binary circuit for simplicity. The signal input of this shift register is obtained from an EXclusive-OR or MOD-2 gate 25 whose inputs are obtained by feedback from the output of certain stages of the shift register. This generator may be considered as continuously running, but for initial starting an input can be applied at terminal 27 in case there is no signal stored in any of the stages of the register. The receiver terminal 13 includes similar shift register 41, clock generator 43 and EXclusive-OR gate 45 connected in the same manner except for a switching arrangement 47 in the input to the shift register and a baud synchronizing input to the clock circuit 43.

The switch 47 is shown in solid lines in its normal running position, and in dotted lines in the synchronizing position now being considered, connecting the signal thru the channel 15 directly to the input of the shift register 41. In this position the received signal is propagated thru the shift register and generates feedback signals thru EXclusive-OR gate 45 in the same manner as in the transmitter OR gate 25. However, in case of an error occurring in the channel 15 there will be additional errors in the feedback circuits as this original error propagates along the shift register.

First assuming that such errors do not exist, the switch 47 may be changed to intermediate position at which both the received signal and the feedback signal are applied as input to the shift register. Assuming no errors the signals are identical and there will be no change in operation. When the switch is further moved to disconnect the input from the channel 15, the receiver generator becomes identical to that in the transmitter except for the baud synchronization applied to the clock circuit 43. Therefore, the transmitter and receiver quasi-random generators are synchronized both as to bauds and frames until some major disturbance in the system. In case an error is being propagated thru the register when the switch is restored to its normal run position the synchronization will fail, but it is merely necessary to repeat the switching operation. If the error rate were so high as to cause extended difficulty in synchronization the channel would be of no practical value anyway for communication. The signal from the channel 15 and the feedback signal from EXclusive-OR gate 45, which provide the two alternative inputs to the shift register 41, are also applied as inputs to the EXclusive-OR gate 49. This provides an output in case of a signal at either input, unless there is a signal at both inputs. Thus an output from the gate 49 corresponds to a difference or disagreement between the two inputs, representing an error generated in the channel 15.

The counter 51 accumulates these errors over some predetermined period of time to show the error rate of the channel. For convenience in reading the counter it might involve dual display operated alternately, each one being read while the other is accumulating a new count. Ordinarily this error rate would be much less than 1% requiring only a rather small counter. However, in case of loss of frame synchronization between the transmitter and receiver quasi-random generators, the error rate would become 50% and would require a counter of a large number of stages if it were desirable to actually count the errors over a substantial interval. However, in case of loss of synchronization a much more frequent reset of the counter could be utilized or the operator might merely observe a very rapid change of the counterreading to indicate loss of frame synchronization.

The invention has been described in a very elementary form to emphasize the basic operation without any obscuring details. Many variations would be apparent to those skilled in the art.

What is claimed is:

1. A system for digital communication error measurement involving a transmitter terminal, channel under test, and receiver terminal, a first shift register at said transmitter terminal having a signal input, shift input, and stage outputs, a timing means connected to said shift input, and feedback means from certain stage outputs to said signal input, whereby a quasi-random binary function of a length determined by the number of shift register stages and the selected feedback connections is generated at the shift register input, said function also being applied thru said communication channel to said receiver terminal, a second shift register, timing source means, and identical feedback means at said receiver terminal, with means to synchronize said receiver timing means to the function received thru said channel, and means to compare the function generated at said receiver with the function received thru said channel, wherein the input connection to said receiver shift register includes means to switch from only the function generated at said receiver feedback means to include the function generated at said transmitter terminal and applied thru said channel to said receiver terminal and then to restore connection to only said feedback means, whereby operation of said receiver shift register is synchronized to said transmitter shift register, and synchronized operation of said transmitter and receiver feedback registers is maintained by said timing sources.

2. A system for digital communication error measurement involving a transmitter terminal, channel under test, and receiver terminal, a first shift register at said transmitter terminal having a signal input, shift input, and stage outputs, a timing means connected to said shift input, and feedback means from certain stage outputs to said signal input, whereby a quasi-random binary function of a length determined by the number of shift register stages and the selected feedback connections is generated at the shift register input, said function also being applied thru said communication channel to said receiver terminal, a second shift register, timing source means, and identical feedback means at said receiver terminal, with means to synchronize said receiver timing means to the function received thru said channel, and means to compare the function generated at said receiver with the function received thru said channel, wherein the input connection to said receiver shift register includes means to switch from the function generated at said receiver feedback means to the function generated at said transmitter terminal and applied thru said channel to said receiver terminal and then to restore connection to said feedback means, whereby operation of said receiver shift register is synchronized to said transmitter shift register, and synchronized operation of said transmitter and receiver feedback registers is maintained by said timing sources.

3. The invention as in claim 2 wherein the switching means is so arranged that the input connection to said receiver shift register is connected to both the receiver feedback means and the signal applied through said channel during transfer from one to the other, whereby loss of input during transfer is avoided.

References Cited by the Examiner

UNITED STATES PATENTS

| | | | |
|---|---|---|---|
| 2,740,106 | 3/1956 | Phelps | 340—147 |
| 3,162,837 | 12/1964 | Meggitt | 340—146.1 |
| 3,164,804 | 1/1965 | Burton et al. | 340—146.1 |

MALCOLM A. MORRISON, *Primary Examiner.*

M. P. HARTMAN, *Assistant Examiner.*